United States Patent [19]
Smith, Jr. et al.

[11] Patent Number: 5,285,391
[45] Date of Patent: Feb. 8, 1994

[54] MULTIPLE LAYER ROAD MEMORY STORAGE DEVICE AND ROUTE PLANNING SYSTEM

[75] Inventors: Bernard C. Smith, Jr., Arlington Heights; Laura J. Link, Hanover Park, both of Ill.

[73] Assignee: Motorola, Inc., Schaumburg, Ill.

[21] Appl. No.: 740,347

[22] Filed: Aug. 5, 1991

[51] Int. Cl.$^5$ .................................. G06F 15/50
[52] U.S. Cl. ............................ 364/443; 340/995
[58] Field of Search ............ 364/443, 444, 449; 340/990, 995

[56] References Cited

U.S. PATENT DOCUMENTS

| | | | |
|---|---|---|---|
| 4,570,227 | 2/1986 | Tachi et al. | 364/444 |
| 4,675,676 | 6/1987 | Takanabe et al. | 340/995 |
| 4,744,033 | 5/1988 | Ogawa et al. | 364/443 |
| 4,760,531 | 7/1988 | Yasui et al. | 364/443 |
| 4,761,742 | 8/1988 | Hanabusa et al. | 364/443 |
| 4,924,402 | 5/1990 | Ando et al. | 364/449 |
| 4,954,959 | 9/1990 | Moroto et al. | 364/449 |
| 4,984,168 | 1/1991 | Neukrichner et al. | 364/449 |
| 4,989,151 | 1/1991 | Nuimura | 364/449 |
| 5,084,822 | 1/1992 | Hayami | 364/449 |
| 5,168,452 | 12/1992 | Yamada et al. | 364/444 |

FOREIGN PATENT DOCUMENTS

0346492A1  12/1989  European Pat. Off. .
02-056591  2/1990  Japan .

OTHER PUBLICATIONS

AFIPS Conf. Proc. National Computer Conference, 9-12; Jul. 1984. pp. 697-796.
"A Guidance System for Automobiles of the Tokyo Metropolitan Road Network using Multimedia", Masami Kato, Keisuke Ohnishi, Department of Electrical and Electronic Engineering, Faculty of Science and Technology, Sophia University, pages 1 through 8. (Presented at ISATA at Florence, Italy, May-Jun. 1991).
"Database Design, Development, and Access Considerations for Automotive Navigation", David C. Marsh, Navigation Technologies Corporation, CH2789-6/89/0000-0337 ©1989IEEE, pp. 337-339.
"The Travelpilot: A Second-Generation Automotive Navigation System", James L. Buxton, et al. IEEE Transactions on Vehicular Technology, vol. 40, No. 1, Feb. 1991 0018-9545/91/0200-0041, pp. 41-44.

*Primary Examiner*—Thomas G. Black
*Assistant Examiner*—Collin W. Park
*Attorney, Agent, or Firm*—Phillip H. Melamed; John H. Moore

[57] ABSTRACT

A route planning system (10) uses a computer (11) and stored road data to calculate a desired route to a destination. Road data is stored in a multiple layer road map data memory (13) in hierarchical multiple layers (17, 18, 19), each layer defining roadways by stored road segments (1S1-3S7) which extend between nodes (135-365)that correspond to roadway intersections. A first or lower layer (17) of road data designates a large number of first layer vehicle roadways while a second or higher level layer (18 or 19) of road data designates only some of the large number of first layer roadways as second layer roadways. Preferably, stored second layer road segments (2S1-2S17 or 3S1-3S7) extend between intersections of the roadways designated in the second layer rather than between intersections of roadways in the second layer with roadways or road segments not designated in the second layer but designated in the first layer. Preferably, at least some of the second layer road segments (2S1-2S17 or 3S1-3S7) are equivalent to the combination of several road segments (1S1-1S52)stored in the first layer. The road map data memory (13) and route planning system (10) minimize storage requirements for road data while speeding up the route planning process.

16 Claims, 4 Drawing Sheets

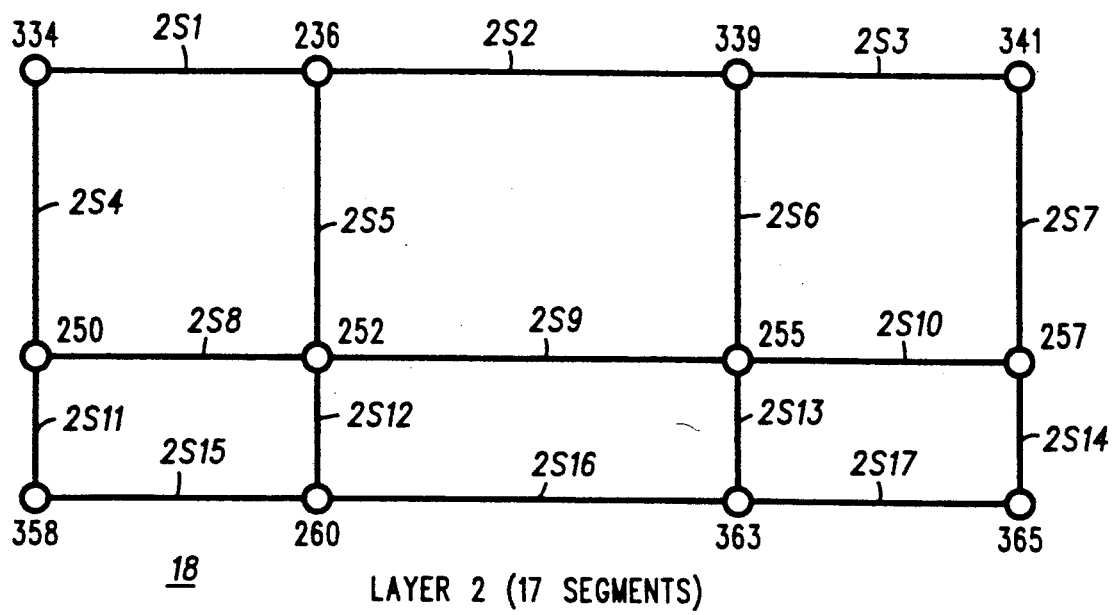
FIG.4 LAYER 2 (17 SEGMENTS)
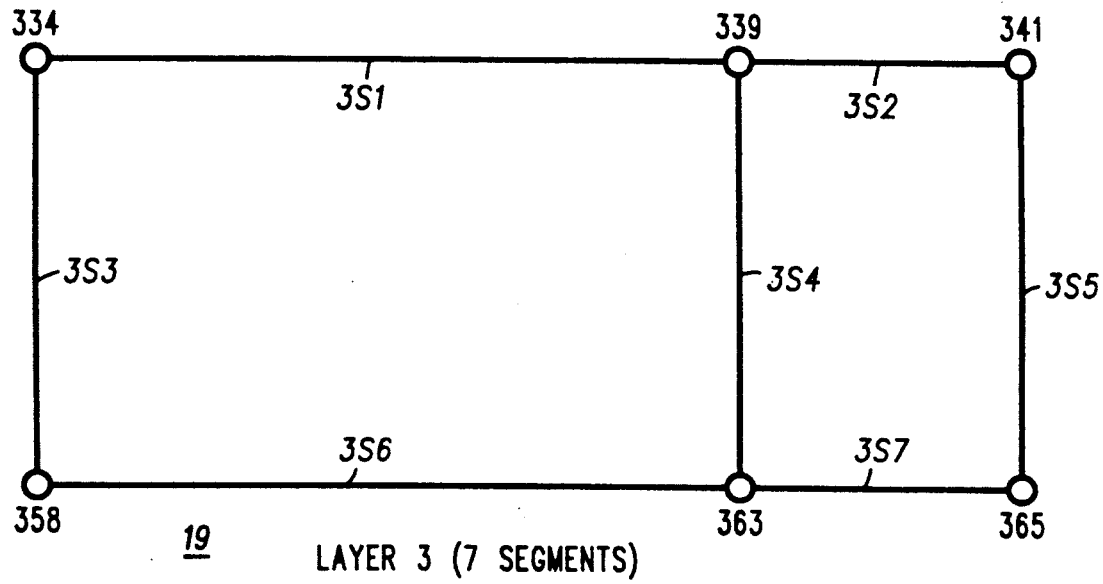
FIG.5 LAYER 3 (7 SEGMENTS)
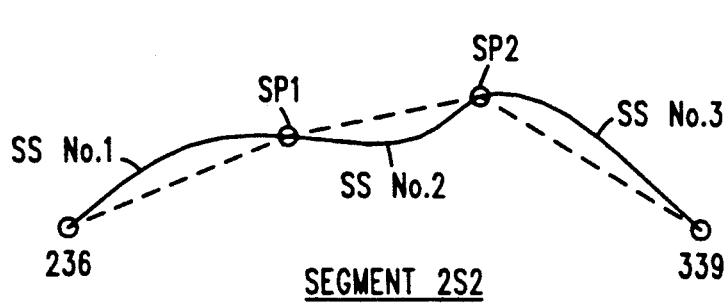
FIG.6 SEGMENT 2S2

ROAD SEGMENT INFORMATION — 19

- SEGMENT ID
- ROAD ID
- SEGMENT LENGTH
- No. OF LANES OF SEGMENT
- RESTRICTION CLASS
- ONE WAY OR NOT
- IMPEDANCE (COMBINATION OF TIME OF DAY, ROAD WIDTH, CLASS, SPEED LIMIT, ETC.)
- POSTED SPEED LIMIT
- No. OF POINTS IN SEGMENT (SHAPE POINTS AND NODES)
- SEGMENT HEADING/DIRECTION/ALIGNMENT
- RIGHT NODE LATITUDE, LONGITUDE, LOGICAL ALTITUDE — NODE INF.
- LEFT NODE LATITUDE, LONGITUDE, LOGICAL ALTITUDE — NODE INF.

SHAPE SEGMENT INF. FOR EACH SHAPE SEGMENT WITHIN EACH ROAD SEGMENT — 20

- ROAD SEGMENT ID
- LATITUDE, LONGITUDE, LOGICAL ALTITUDE OF SHAPE SEGMENT END POINTS (SHAPE POINTS)
- INDEX No. (No. OF SHAPE SEGMENT)
- LENGTH OF SHAPE SEGMENT
- HEADING OF SHAPE SEGMENT

FIG. 7

MULTIPLE LAYER ROAD MEMORY STORAGE DEVICE AND ROUTE PLANNING SYSTEM

FIELD OF THE INVENTION

The present invention relates to the field of multiple layer road memory storage devices and route planning systems which utilize multiple layer road memory storage devices.

BACKGROUND OF THE INVENTION

Many prior vehicle route planning systems are known in which data concerning fixed roadways in a predetermined geographical area are stored in a memory device and the route planning system utilizes such data in determining an optimum route to a desired destination via the fixed roadways. Most prior automobile/vehicle route planning systems for planning travel along fixed roadways utilize some form of such prior systems. In such prior systems the desired route is achieved by accessing the data defining all of the possible roadways for travel and then selecting, according some predetermined criteria, which fixed roadways should be utilized to define an optimum path to the desired destination.

In some of the above noted prior route planning systems, the roadway data is stored hierarchically in several different layers of road data with, typically, one layer representing a detailed road layer in which all roadways are designated and another layer representing a higher layer containing just vehicle roadways having certain travel characteristics rather than all roadways. Thus a detailed roadway layer having every road and street of every type is provided, and then, for example, a higher layer of roads having information about just major roads and limited access expressways may be provided. Of course this can be extended such that an even higher layer of roadways can be stored having, for example, just limited access expressway roads. In such prior systems, typically route planning occurs by having origin and destination locations located on the most detailed layer. Then, a route is provided to an intersection of roadways that are defined on the next higher roadway layer. Then, route planning is implemented on the higher roadway layer. In this manner, more efficient route planning is achieved since the majority of the route planning will occur at the higher road layer which therefore will ignore data and potential road choices relating to roadways not designated in this higher layer. Several such prior multiple layer systems are known and have been described in various articles.

In previously known multiple layer road memory devices, and route planning systems which utilize such devices, each roadway in each layer is defined by road segments which make-up each roadway, and each road segment extends between intersections of that roadway with other roadways in the same layer. Route planing occurs by determining, at each intersection, what other road segments are connected to that intersection. Then, one of the these road segments is selected for use in the desired route. The route segment selection typically occurs in accordance with some predetermined criteria, and several systems are known which utilize various criteria for accomplishing this. In some systems, a route is determined by simultaneously searching from both the origin and the destination for a desired route. The search ends when a common road segment is found by this simultaneous double searching. An example of this type of searching is commonly known as the double ended A-star algorithm.

In known prior route planning systems which utilize multiple layer road data storage, the layers differ only in that some road segments found in the lower layer are not carried forward into the higher layer since the roadways defined by those segments are not to be provided or designated in the higher layer. For roadways which are defined in both the higher and lower layers, the road segments which define the roadway in the lower layer are reproduced substantially exactly in the higher layer. Thus some road segment data in the first layer is just duplicated in the second layer and no reformatting of this data is needed. However, one result of this is that a relatively large amount of memory is required for the higher layer because all of the small road segments for a roadway contained in the lower layer are carried forward into the higher layer if the roadway is also contained in the higher layer. A more significant disadvantage of the prior systems is that route planning still is relatively time consuming because decisions are made at the end of each and every road segment as to whether or not there are any additional road segments connected to these road segments and which of these additional road segments are to be selected. The route planning process generally always implements such steps even though there is only one road segment that is connected to the end of another road segment in the second layer. While the prior systems have an advantage in that the roadway data in the second layer is just a direct subset of the roadway data in the first layer, this is offset by the fact that the second layer requires a substantial amount of memory, and also by the fact that the time for route planning still is relatively lengthy, especially when route planning takes place over a substantial distance and therefore involves several hundred or several thousand individual road segments.

SUMMARY OF THE INVENTION

In one embodiment of the present invention, a multiple layer road memory storage device is provided. The device comprises a road memory means for storing therein road data defining fixed roadways located in a predetermined geographical area, wherein this road data is hierarchically stored in multiple layers in the road memory means. The road memory means includes a first portion for storing a first detailed layer of road data designating a large number of first layer vehicle roadways of various categories and their intersections with each other. Each stored first layer roadway is defined at least by stored first layer road segments which extend between stored first layer nodes that correspond to each of the first layer roadway intersections. The road memory means also includes a second portion for storing a second higher level layer of road data designating only some of the large number of first layer roadways as second layer roadways and designating second layer roadway intersections between each of the second layer roadways. Each of the second layer stored roadways is defined at least by stored second layer road segments which extend between stored second layer nodes which correspond to intersections of roadways designated in said second layer with other roadways designated in said second layer rather than between intersections of roadways in the second layer with roadways/road segments designated in the first layer but not the second layer. A route planning system which utilizes such a road memory storage device is also provided wherein a route planning computer means utilizes the data in the first and second stored roadway layers to determine a desired route to a destination via the stored fixed roadways. Preferably, at least some of the road segments stored in the second layer are the equivalent of the combination of several of the road segments stored in the first layer.

By utilizing a multiple layer road memory storage device and route planning system as described above, less storage space is required for storing the second layer of road data since the second layer road segments are combinations of several of the individual road segments stored in the first layer. This reformatting of the road data to create combination road segments for the second layer also results in improving the route planning process since there will be fewer nodes corresponding to the ends of road segments in the stored second layer of road data. These advantages and others are subsequently discussed in more detail.

BRIEF DESCRIPTION OF THE DRAWINGS

The present invention can be better understood by reference to the drawings, in which:

FIG. 4 is a schematic diagram of a second and higher layer of roadway data stored in the device in FIG. 2;

FIG. 5 is a schematic diagram of a third layer of roadway data stored in the device in FIG. 2;

FIG. 6 is a diagram illustrating a potential configuration for one road segment stored as part of the second layer shown in FIG. 4;

FIG. 7 is a chart indicating the type of information stored for each road segment in each of the layers shown in FIGS. 3, 4 and 5;

DETAILED DESCRIPTION OF THE PREFERRED EMBODIMENTS

Figure 1:
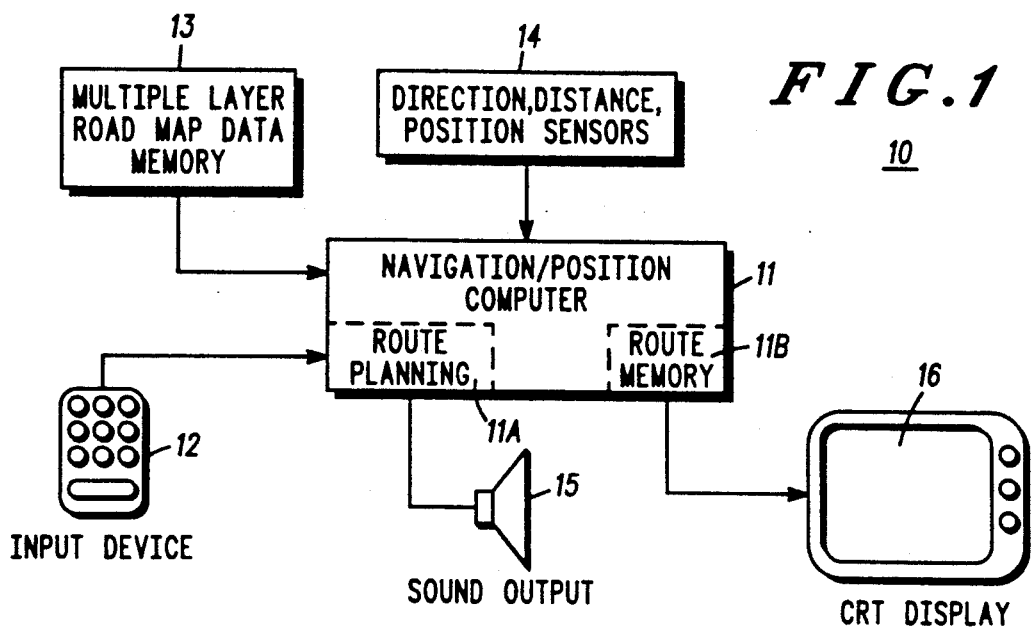
FIG. 1 is a schematic diagram of a route planning system.

Referring to FIG. 1, a vehicle route planning system 10 is illustrated which includes a navigation computer 11 that receives input information from an operator controlled input device 12, a multiple layer road map data memory device 13, and direction, distance and position sensors designated in block form as block 14. The navigation computer 11 includes therein route planning apparatus, comprising appropriate programming of the computer 11 and designated in FIG. 1 as block 11A, to calculate a desired route, via fixed roadways stored in the memory device 13, to a desired destination. After this route is calculated, the calculated route will be stored in a route memory location designated in FIG. 1 as area 11B. Then the navigation computer 11 will provide appropriate audio/visual instructions to a vehicle operator to enable him to travel the calculated route wherein a speaker 15 and a CRT visual display 16 provide such information to the vehicle operator.

Essentially, a vehicle operator will use the input device 12 to tell the navigation computer 11 where he wants to go (i.e. a destination). The memory device 13 has stored therein all of the possible roadways in a predetermined geographical area which can be used for traveling in that area. The navigation computer 11 then determines the present position of the vehicle or this position can also be input to the computer by the vehicle operator using the input device 12. The navigation computer then calculates an optimum route to the desired destination and the route is stored in the route memory 11B. This operation, as described above, takes place in many of the many known route planning systems and also in known navigation systems which utilize route planning as a part thereof. Subsequently, the navigation computer, on the basis of the route stored in the memory 11B, and the travel path/position of the vehicle as determined by the sensors 14, will provide appropriate navigation instructions to the vehicle operator via the speaker 15 and visual display 16. Such navigation systems are known and described in prior literature.

A significant feature of the present route planning system 10 is that the memory device 13 is a multiple layer road map memory device in which road data is stored in various layers such that there exists a lower or base layer in which every roadway is defined and there exists at least one higher layer in which only some roadways are defined while minor roadways are not defined therein. Thus, for efficient route planning, some of the route planning will occur by utilizing the second or higher level of road data. Route planning in the second or higher level is more efficient since less data is present and therefore less data has to be reviewed in this higher layer in order to plan a desired route.

Figure 2:
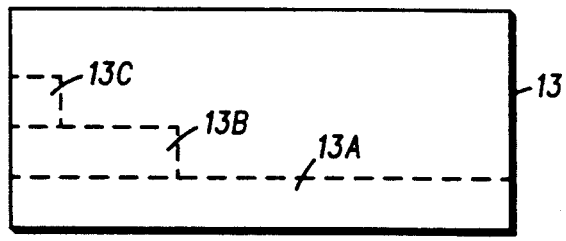
FIG. 2 is a schematic diagram representing the internal configuration of a memory device which is part of the system shown in FIG. 1.

FIG. 2 schematically represents the internal configuration of the memory device 13 in which a first or lower level layer of road data is stored in a large memory portion 13A of the memory device 13 while a second or higher layer of roadway data is stored in a much smaller memory portion 13B of the memory device 13 and a third and even higher layer of roadway data is stored in an even smaller memory portion 13C of the memory device 13. While three layers of roadway data are indicated in FIG. 2, even providing just two layers of memory data will provide a significant advantage for the route planning system 10 when the data is arranged as described herein. Also, providing additional layers of roadway data is also possible. The road data in the memory device 13 is hierarchically stored in multiple layers with each layer designating vehicle roadways in that layer and their intersections with each other. The contents of each of these layers will now be more fully described in connection with FIGS. 3 through 7.

Figure 3:
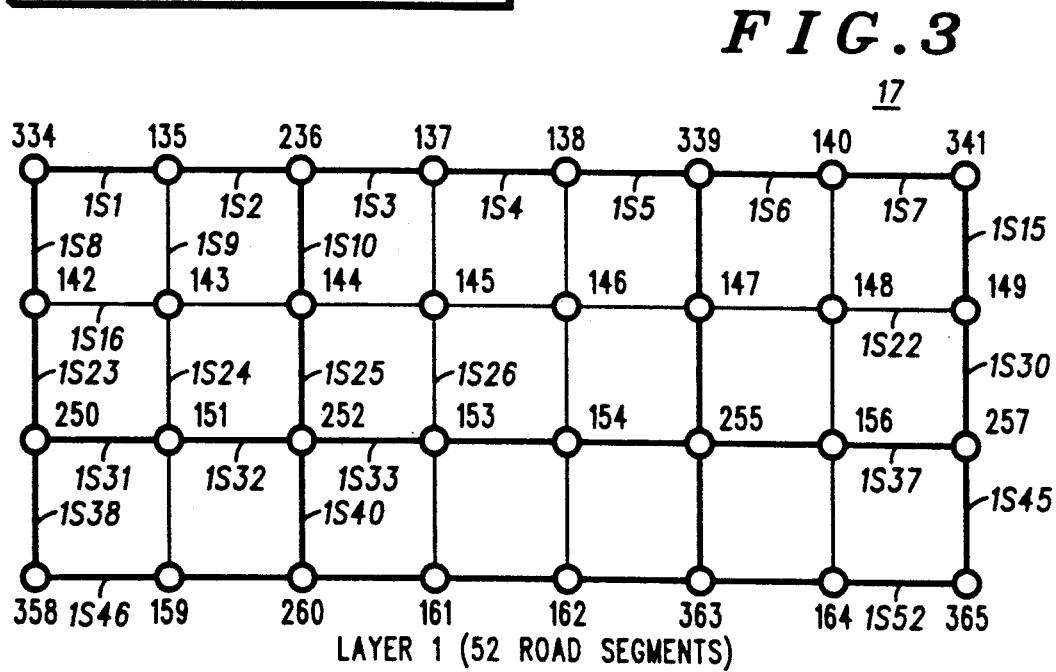
FIG. 3 is a schematic diagram of various roadways designated in a first layer of stored roadway data in the device in FIG. 2.

Referring to FIG. 3, a first or lower roadway layer 17 is illustrated in schematic form as comprising a road network having 52 individual road segments. Each of the road segments in FIG. 3 is designated as 1S1 through 1S52. Each individual road segment in the first layer extends between two end points of this road segment which correspond to first layer nodes that correspond to intersections of the roadways in the first layer with other roadways contained in the first layer.

Preferably, the first or lowest layer, layer 17, of road segments shown in FIG. 3 comprises every fixed vehicle road path in a geographical area. Thus all roads, such as residential, main arterial and limited access expressways, are shown in FIG. 3 with all of their intersections with other roads that are shown in FIG. 3. FIG. 4 represents a higher layer 18 of roadway data and thus only some of the roadways shown in FIG. 3 will be represented in FIG. 4. For example, FIG. 4 would represent the main arterial and limited access roadways, but not the smaller residential streets that are also shown on the first layer. The higher layer 18 has seventeen road segments 2S1 through 2S17. Similarly, FIG. 5 represents a higher layer 19 which includes, for example, just the limited access highways and does not include the main arterial roads shown in FIGS. 3 and 4 or the residential streets shown just in FIG. 3. The layer 19 has seven road segments 3S1 through 3S7. "Nodes" 135–365 corresponding to road segment end points are illustrated as circles in FIGS. 3–5. These nodes represent intersections of road segments of one road in one layer with road segments of a different road in the same layer. Nodes having numbers in the one hundreds are only in layer one (layer 17), while nodes having numbers in the two hundreds are in both layers 17 and 18, and nodes having numbers in the three hundreds are in each layer 17, 18 and 19.

The basic idea of prior multiple layer road memory devices is to create different layers of road data so that route planning can occur efficiently by planning the majority of the route on a higher layer than the lowest road data layer. This is because on a higher layer you will essentially automatically exclude travel on less desirable streets such as residential streets because data concerning the road segments that comprise these residential streets will not be present on the higher level. Therefore, by planning a route on a higher layer, less desirable road segments do not have to be considered by the route planning software of a navigation computer.

While prior multiple layer storage devices, and route planning systems using such devices, have attempted to achieve the above noted route planning calculation efficiency, they apparently were also concerned with minimizing the effort to create the data in the higher road map data layers. Thus, for example, prior systems would not have a higher layer corresponding to the layer 18 as shown in FIG. 4. Instead, the prior systems would carryover all of the node data and road segment data for the roads shown in FIG. 3, except for deleting road segment data that just pertained to road segments for the residential or lower roads that were not in layer 18. Traveling along a straight road between intersections 334 and 341 you would encounter seven road segments in the first layer 17 comprising road segments 1S1 through 1S7. Prior systems would retain all of these seven road segments as individual road segments when a prior system implemented its next higher layer which included the straight road between 334 and 341. An advantage of such a structure would be that you don't have to reformat the road data on the second or higher layer to define a straight line road path between the intersections 334 and 341. However, the multiple layer road memory storage device 13 in the present route planning system 10 does not retain these seven segments. Instead, the system 10 and memory device 13 essentially stores super road segments in layer 18 consisting of segments 2S1, 2S2 and 2S3 (FIG. 4) which correspond to the straight line road path between the intersections 334 and 341.

While the system 10 contemplates reformatting of road data to define super segments, such as segment 2S1, a substantial benefit is achieved in that substantially less storage space is required for the second layer 18 in the memory device 13 than would be required for a prior art second layer. In addition, there is a substantial improvement in the efficiency of route planning which occurs. This is because all route planning contemplates stopping at each road segment end node, corresponding to an intersection, and inquiring what other road segments are connected to it and then selecting a road segment that is connected to this node. For the straight line road between intersections 334 and 341, there are seven segments and six interim nodes (135, 236, 137, 138, 339, 140) contained in the layer 17 comprising the lowest road map layer 17 in FIG. 3. A prior art second or higher layer would retain all these segments and nodes. Thus for prior art first or second layer route planning, at each of the six interim nodes a search routine would be executed to compile a list of all possible road segments that are connected to the six interim nodes, and then there would be an additional computer step to select the optimum road segment connected to each interim node. By reducing the number of interim nodes between the nodes 334 and 341 to only two nodes (236, 339) in layer 18 shown in FIG. 4, obviously fewer computer calculations are required. Also, as was previously mentioned, less storage space is required. This is because layer 18 stores only the three segments 2S1–2S3 rather than seven segments in the second layer to cover the straight road distance between nodes 334 and 341.

Referring to FIG. 7, all of the road segment information which is preferably typically stored for each individual road segment is shown in a chart portion 19. Thus for each road segment, a segment ID number is stored which identifies that specific road segment of a road. In addition, a road ID number is stored that identifies which road the segment is a part of. The length of the road segment is also stored along with information as to the number lanes in the actual road which corresponds to the stored road segment. Additional information is provided regarding any restriction class for the road segment, such as not permitting trucks over a certain weight. Also, information is stored as to whether the road segment is one way or not and in which direction the road segment is directed. A number is also stored relating to the impedance of this road segment wherein this impedance is a function of the road width, the class of the road, the speed limit and several other factors which may include the time of day wherein this impedance number would be a dynamically calculated number. Information is also stored with regard to the posted speed limit for the specific road segment. In addition, for each road segment there is stored the latitude, longitude and logical altitude of both a right end node and left end node between which the road segment extends. These right and left end nodes correspond to the end points of the road segment. These end nodes also correspond to the intersection, in one road layer, of a road segment of one road with a road segment of a different road in the same layer.

It should be noted that, for example, the road segments 2S1–2S17 in the higher layer 18 shown in FIG. 4 are each equivalent to the combination of several of the individual road segments stored in the lower layer 17 shown in FIG. 3. For example, the segment 2S2 in FIG. 4 contains all the necessary information, for layer 18, as was contained in the segments 1S3, 1S4 and 1S5 in FIG. 3. However, now only one road segment, with one composite length and the other information in chart portion 19, is stored for segment 2S2, rather than storing three segments corresponding to the segments 1S3, 1S4 and 1S5 in layer 18.

It should also be noted that the term "node" as used herein refers to the intersection of a road in one layer with another road also contained in that layer. Also, the terminology "right node" and "left node", as stated in the chart portion 19 in FIG. 7, refers to the end points of a specific road segment. If the road segment is substantially horizontal (east-west), the node which is physically on the left (west) side of the road segment is called the left node and node which is on the right (east) side of the road segment is called the right node. If the road segment is substantially vertical (north-south), then the top (north) node is considered the left node and the bottom (south) node is considered the right node. This node terminology is not significant, except that some convention has to be established for these end point nodes of the road segments in order to achieve route planning.

In addition, in case the road segment is not a straight road segment, it may be necessary to break up the road segment into piecewise linear approximations. This has been done in prior systems wherein the interim points for such piecewise linear approximations are referred to herein as shape points. These shape points differ from nodes in that the the shape points do not correspond to intersections of a road segment with road segments of a different road, but are merely utilized to better define the actual position of the road for route navigation and/or vehicle location purposes. In route planning, the existence of these shape points is essentially ignored except that they may have some effect on the impedance number for the road segment. If a road segment has shape points, chart portion 19 will indicate that the "No. of Points in Segment" is more than 2 since the end nodes would count as 2 points in the segment. If a road segment has a shape point, then the road segment will consist of several shape segments. Information regarding these shape segments is stored in an additional chart portion 20 shown in FIG. 7. The additional information concerning the shape segments consists of the road segment ID, the latitude, longitude and logical altitude of the shape segment end points (shape points), an index number describing the number of the shape segment being specified, information as to the length of this specific shape segment and information as to heading of the shape segment.

It should be noted that when the term "logical altitude" is utilized herein referring to shape points or nodes, this is used as an indication of the logical stacking of multiple road segments which cross each other. Thus, for example, roads which cross each other but do not actually intersect since there is an underpass or overpass would have different logical altitudes associated with nodes that may exist at that apparent but not actual intersection. This information is therefore used to determine if a road segment actually intersects another road segment since the nodes for that intersection, if the roads do intersect, would have the same logical altitude.

With regard to the above discussion of shape points, FIG. 6 illustrates how the segment 2S2 shown in FIG. 4 could comprise a single road segment comprising three shape segments numbered 1 through 3 (SS1-SS3) and two interim shape points SP1 and SP2. What is shown in FIG. 6 in solid line form is the actual curvature of the road, for example, whereas a straight line piecewise linear approximation of the road is shown in dashed form in FIG. 6.

A major feature of the route planning system 10 is that the storage of road information in various layers will utilize substantially less storage space. This can readily be determined by noting that a higher layer such as the second layer 18 in FIG. 4, only includes 17 road segments to cover the same geographical area as the 52 road segments shown in FIG. 3. When it is realized that each road segment must include all of the information in chart portion 19 shown in FIG. 7, it then can be appreciated that this memory storage savings is significant. Prior systems would not reformat the road segment data to create super segments. Thus a prior art second layer corresponding to layer 18 would store 33 road segments.

As noted before, the route planning system 10 also enhances the speed of route planning because fewer decisions are required since fewer road segment end nodes are utilized in the higher layers. While prior systems attempted to improve route planning efficiency by eliminating lower level roads from higher level road layers and then performing route planning on the higher road level layers, they did not reformat the data for the higher level layers. This resulted in still requiring time consuming searches for all road segments connected to intersections that, in the higher level layer, only had one additional road segment of a road connected to it other than the road segment of the same road used to reach that node. While the FIGS. 3 through 5 just illustrate the saving of a few nodes and the reducing of the number of road segments by a few road segments as compared to the prior art, it certainly can be appreciated that in a typical metropolitan area there will be many thousands of nodes and road segments for the lowest detailed layer. Because of this, route planning was significantly impaired when prior systems attempted to plan a route across large areas of a metropolitan city involving the crossing of thousands of road intersections of arterial highways and limited access highways with residential streets. The present system and the prior systems would eventually arrive at the same route as being an optimum route. However, the prior systems would include thousands of additional computer steps at nodes which are not necessary in the higher layers. This makes the prior systems inefficient in their route calculations, whereas the present route planning system overcomes this deficiency.

It should be noted that while a higher layer, such as layer 18 in FIG. 4, is shown as having fewer nodes, the road segments for such a higher layer, such as segment 2S2, may have additional shape points within it to describe changes in direction of the road segment. Such possible shape points are shown in FIG. 6. However, shape points are not utilized in the basic route planning calculation and therefore there existence does not slow down route planning. Thus, while the segment 2S2, for example, in FIG. 4 may have a relatively large chart portion 20, as shown in FIG. 7, to describe its interim shape points, the size of its road segment information portion 19 will be substantially the same as that of any of the road segments in layer 17. This is only being mentioned because it is possible that in a higher layer, such as layer 18 in FIG. 4, some lower level nodes, such as nodes 137 and 138, may be carried forward into the higher level layer as shape points instead of nodes which correspond to intersections of different roadways in the layer 18. This will not effect the efficiency of route planning and merely results in a somewhat more extensive shape point memory portion 20 for defining the road segment 2S2. A system which carries all low level layer nodes forward as either nodes or shape points of super segments of a higher layer is feasible and will still utilize less overall storage space and have greater route planning efficiency than prior systems.

Figure 8:
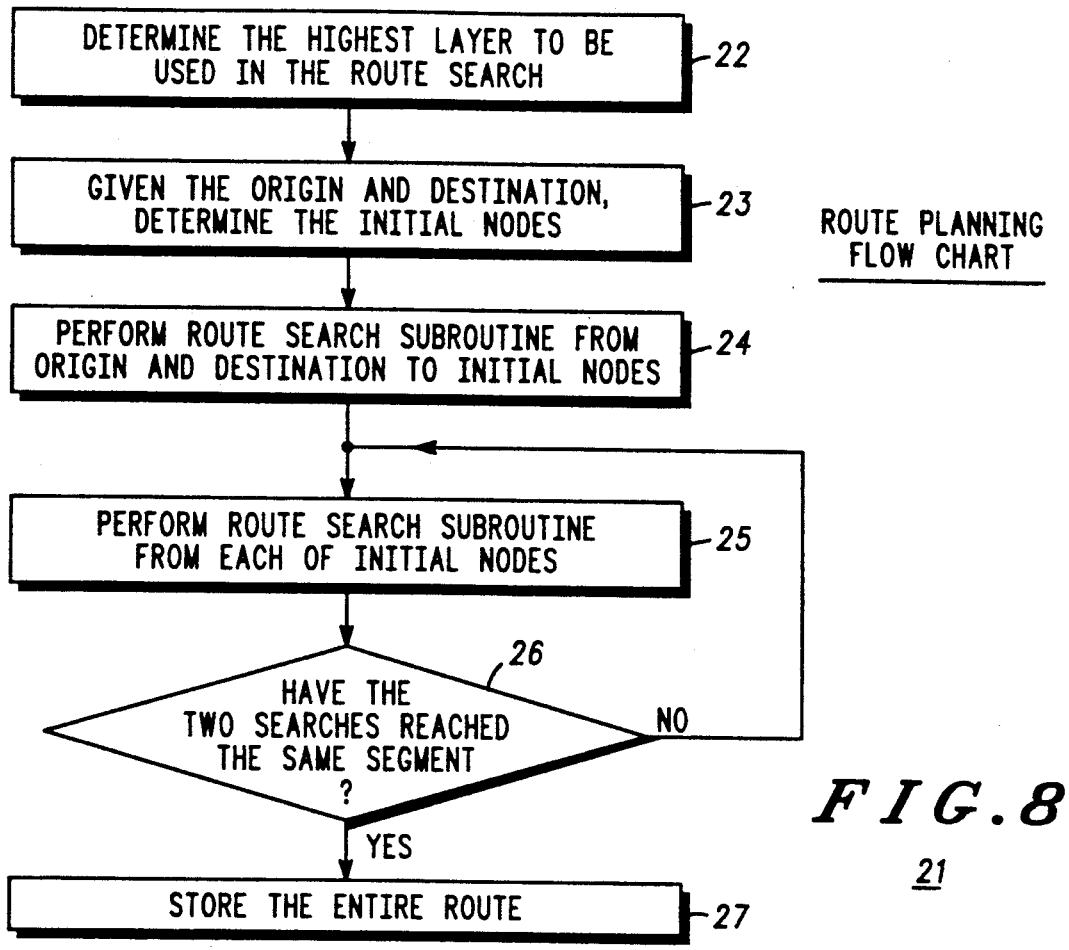
FIG. 8 is a flowchart illustrating the general operation of the route planning system shown in FIG. 1.

Referring to FIG. 8, a flowchart 21 representing the operation of the route planning system 10 is illustrated. The flowchart 21 essentially represents the operation of the navigation computer 11 in utilizing the road data in the road map data memory device 13 to perform a route planning function. The flowchart 21 is therefore representative of the programming of the navigation computer 11. The flowchart 21 is entered at an initial step 22 which determines the highest road data layer to be used in route planning. Essentially, the distance, "as the crow flies", from the origin location of the vehicle to the desired destination is used to determine the highest search layer to be used in route planning. The greater the distance between the origin and the destination, the higher the layer which will be used as the maximum possible layer for route planning. For example, if 2,000 miles separate the origin and the destination, you would probably use up to the highest possible map layer for route planning. Whereas if only 2 miles, for example, separate the origin from the destination, probably just the lowest and most detailed map layer would be the highest layer utilized. All that process block 22 determines is what is the maximum possible road map layer to be used in any route planning. This determination is based on the distance between the origin and the destination.

After process block 22, control passes to a process block 23 which determines the closest initial nodes to the exact longitude and latitude positions of the origin and destination. After process block 23, control passes to process block 24 which performs a route search subroutine to determine the optimum route from the origin and destination to their associated closest initial nodes. The operation of this route search subroutine in process block 24 and a similar route search subroutine in a subsequent process block 25 is schematically illustrated by a flowchart 28 shown in FIG. 9. After a route to the initial nodes has been found by block 24, then control passes from process block 24 to process block 25 which performs a route search subroutine starting at each of the initial nodes in order to find a route from each of these nodes to the other. This double searching from each initial node towards the other initial node is conventional and is used in most prior route search subroutines. Such double end searching is conventionally termed double ended A-star searching. This double searching continues per process block 25 until the double searching has determined that each of the routes being searched has then reached the same road segment as determined by decision block 26. When this has occurred, control passes to a process block 27 which returns the entire found route and stores it in the route memory location 11B in the navigation computer 11. This entire route includes the route (per block 25) to be travelled between the initial nodes closest to the origin and destination and the route (per block 24) from the origin and destination locations to these initial nodes.

Essentially, block 23 determines what is the closest road map node to each of the destination and origin locations. Since the origin and destination are defined in terms of latitude and longitude and so are the nodes, clearly this does not represent a complex or difficult programming step. The process block 24 then determines how do I get from the origin or destination to this closest initial node. The process block 25 determines how do I optimally travel between these initial nodes. The steps in blocks 24 and 25 are achieved by implementing the route search subroutine shown in FIG. 9 as flowchart 28.

Figure 9:
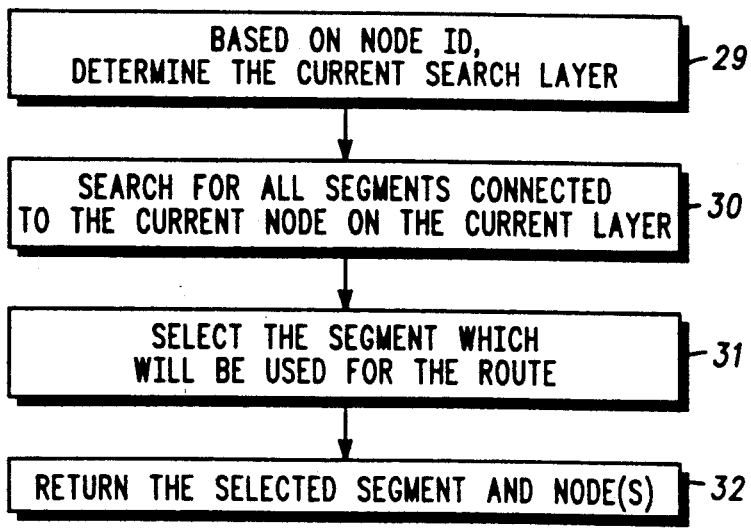
FIG. 9 is a flowchart illustrating in more detail one of the flowchart steps shown in FIG. 8.

Referring to FIG. 9, the search subroutine flowchart 28 is entered at an initial process block 29 which determines the current road map search layer to be utilized based on a current node ID wherein the node has been determined to be part of the route to be calculated. If the search subroutine is to find a route from the origin or end destination to the previously identified closest initial node, then this initial node as well as the origin or end destination locations will determine the current search layer. Once route planning has proceeded so that a node is now added as part of the route and is a starting point for route planning, that node will determine the search layer. It should again be noted that each node has a numerical designation as shown in FIGS. 3 through 5, and that the initial numerical designation determines the highest layer on which that node will exist with that node also existing on all lower layers. It should also be noted that the step 29 will also take into account the maximum search layer determined by the process block step 22 such that for short distances, for example, a very high level search layer will not be utilized even if the closest initial node or the latest node identified as being a starting point for the calculated route appears on a high level layer.

After process block 29, control passes to process block 30 which implements a search for all segments on the current search layer which are connected to the current node. Thus, for example, if the current search layer is layer 17 shown in FIG. 3, and the current node is node 252, road segments 1S25, 1S32, 1S33 and 1S40 will be retrieved. However, if the current search layer is the higher search layer 18 shown in FIG. 4, then road segments 2S5, 2S8, 2S9 and 2S12 will be retrieved.

After process block 30, control passes to process block 31 which determines which of these retrieved segments will be used for the desired route. This is determined in accordance with a route planning algorithm and any such algorithm can be implemented while still achieving the improvement and savings achieved by the present invention. One criteria which might be used to determine the segment to be selected could be its connectivity to a higher search layer if the current search layer is less than the highest permissible search layer determined by process block 22. Details of the search algorithm comprising the step 31 are not provided since the specifics of this search algorithm are not significant with regard to the improvement achieved by the multiple layer road map data memory utilized in the route planning system 10 and since any such route planning algorithm can be utilized.

Once an optimal road segment is selected by the process block 31, control passes to a process block 32 which temporarily stores this selected road segment and its associated nodes for utilization in road segment comparisons to be implemented by the process block 26. Also, any new node found by process block 31 and added to the route will now become the next current node.

From the above description of the route planning system 10, it is apparent that the creation of super segments which form the higher layer road segments stored in the road map memory device 13 comprises a significant feature which allows minimizing the amount of storage space used for road map data while increasing the efficiency of route planning. While we have shown and described specific embodiments of the present invention, further modifications and improvements will occur to those skilled in the art. Such modifications could, for example, include providing only one higher layer of roadway data or more than two higher layers of roadway data. Such modifications could also include retaining some of the nodes in the lowest layer, layer 17, as shape points in the next highest layer, such as layer 18. Another modification could be providing a system which implements route planning despite dynamic or static route exclusion of a super segment in a higher layer. All this would do would be to possibly require alternate route planning on a lower layer to get around the excluded super segment. However, all such modifications which retain the basic underlying principles disclosed and claimed herein are within the scope of this invention.

What is claimed is:

1. A multiple layer road memory storage device comprising:

a road memory means for storing therein road data defining fixed roadways located in a predetermined geographical area, wherein said road data is hierarchically stored in multiple layers in said memory means, said memory means including a first portion for storing a first detailed layer of road data designating a large number of first layer roadways of various categories and their intersections with each other, each stored first layer roadway is defined at least by individual stored first layer road segments which extend between stored first layer nodes that correspond to each of said first layer roadway intersections, said memory means also including a second portion for storing a second higher level layer of road data designating only some of said large number of first layer roadways as second layer roadways and designating second layer roadway intersections between each of said second layer roadways, wherein each of said stored second layer roadways is defined at least by individual stored second layer road segments each of which represents a portion of one of said second layer roadways and each of which extends between stored second layer nodes which correspond to intersections of roadways designated in said second layer with other roadways designated in said second layer regardless of intersections of first layer road segments corresponding to said portions of said roadways represented by said stored second layer road segments with roadways/road segments designated in said first layer but not in said second layer, and wherein each of said stored second layer nodes, corresponding to an intersection of said stored second layer roadways, directly corresponds to one of said stored first layer nodes corresponding to an intersection of said stored first layer roadways;

wherein at least some of said stored second layer road segments are equivalent to a combination of several of said road segments stored in said first layer, and wherein said some of said stored second layer road segments have a road segment length equivalent to a road segment length of said combination of said segments in said first layer.

2. A multiple layer road memory storage device according to claim 1 wherein each of said road segments stored in said first and second layers has two end points between which the road segment extends, and each stored road segment includes stored end node data defining the location of two node points corresponding to said two end points of each of said road segments.

3. A multiple layer road memory storage device according to claim 2 wherein some of said node points in said first layer correspond to node points in said second layer.

4. A multiple layer road memory storage device according to claim 3 wherein some of said node points in said first layer correspond to shape points in said second layer, wherein said second layer shape points are located within a road segment in said second layer but do not correspond to any end point of a road segment in said second layer.

5. A multiple layer road memory storage device according to claim 3 wherein some of said node points in said first layer have no corresponding road segment node points in said second layer.

6. A multiple layer road memory storage device according to claim 3 wherein all of said node points in said second layer correspond to node points in said first layer.

7. A multiple layer road memory storage device according to claim 1 wherein said stored road data for each of said stored road segments in said first and second layers includes a segment ID for each stored road segment and the length of said stored road segment.

8. A multiple layer road memory storage device according to claim 7 wherein said stored road data includes, for each of said road segments in any of said first and second layers, node data defining the location of node points at each end of said road segment.

9. A route planning system comprising:

a road memory means for storing therein road data defining fixed roadways in a predetermined geographical area, and a route planning computer means coupled to said road memory means for receiving said road data and using it to determine a desired route to a destination via said fixed roadways, wherein said road data is hierarchically stored in said memory means and is stored as a first detailed layer designating a large number of first layer roadways of various categories and their intersections with each other, each stored first layer roadway is defined at least by individual stored first layer road segments which extend between stored first layer nodes that correspond to each of said first layer roadway intersections, and said road data is also stored in said memory means as a second higher level layer having data designating only some of said large number of first layer roadways as second layer roadways and data designating second layer roadway intersections between each of said second layer roadways, wherein said second layer of road data defines said second layer roadways by individual second layer road segments each of which represents a portion of one of said second layer roadways and each of which extends between intersections of roadways in said second layer with other roadways in said second layer regardless of intersections of first layer road segments corresponding to said portions of said roadways represented by said stored second layer road segments with roadways/road segments designated in said first layer but not in said second layer, and wherein said route planning computer uses at least said second layer road segments, as stored in said second layer, in determining said desired route, and wherein each of said stored second layer nodes, corresponding to an intersection of said stored second layer roadways, directly corresponds to one of said stored first layer nodes corresponding to an intersection of said stored first layer roadways;

wherein at least some of said road segments stored in said second layer and used by said route planning computer are equivalent to a combination of several of said road segments stored in said first layer, and wherein said some of said stored second layer road segments have a road segment length equivalent to a road segment length of said combination of said road segments in said first layer.

10. A route planning system according to claim 9 wherein each of said road segments stored in each of said first and second layers has two end points between which the road segment extends and each stored road segment includes end node data defining the location of two node points corresponding to said two end points of each of said road segments.

11. A route planning system according to claim 10 wherein said route planning computer means includes means for searching for all road segments in said second layer which include a predetermined node point in said second layer.

12. A route planning system according to claim 11 wherein some of said node points in said first layer correspond to node points in said second layer.

13. A route planning system according to claim 12 wherein some of said node points in said first layer correspond to shape points in said second layer, wherein said second layer shape points are located within a road segment in said second layer but do not correspond to any end point of a road segment in said second layer.

14. A route planning system according to claim 12 wherein some of said node points in said first layer have no corresponding road segment node points in said second layer.

15. A route planning system according to claim 12 wherein all of said node points in said second layer correspond to node points in said first layer.

16. A route planning system according to claim 12 wherein said route planning computer means also includes means for searching for all road segments in said first layer which include a predetermined node point in said first layer.

* * * * *